J. BRENSIKE.
FAUCET FOR CHEESE APPARATUS.
APPLICATION FILED DEC. 12, 1908.
941,694.
Patented Nov. 30, 1909.
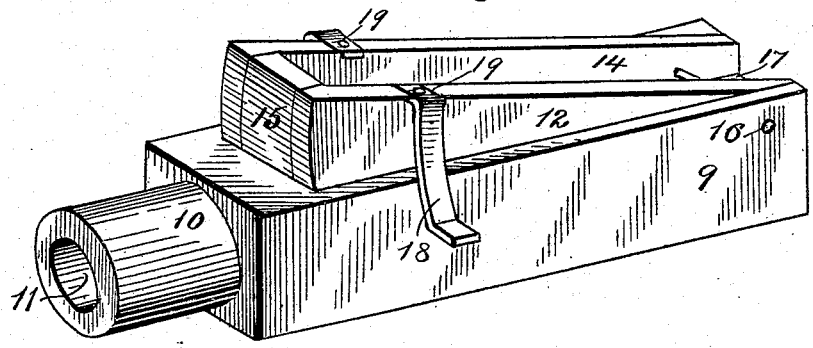
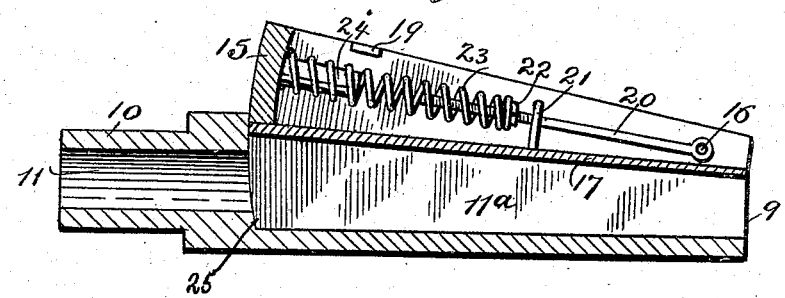
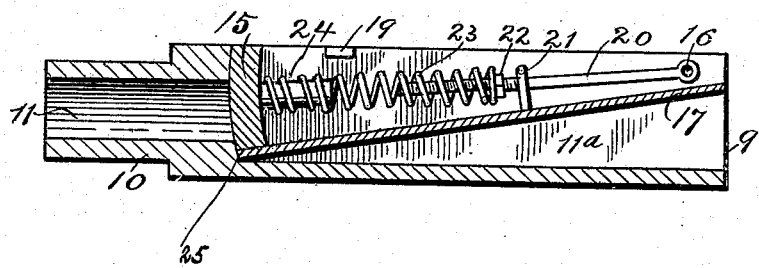

UNITED STATES PATENT OFFICE.

JOHN BRENSIKE, OF HUSTISFORD, WISCONSIN.

FAUCET FOR CHEESE APPARATUS.

941,694. Specification of Letters Patent. Patented Nov. 30, 1909.
Original application filed August 4, 1908, Serial No. 446,906. Divided and this application filed December 12, 1908. Serial No. 467,235.

*To all whom it may concern:*

Be it known that I, JOHN BRENSIKE, a citizen of the United States of America, residing at Hustisford, in the county of Dodge and State of Wisconsin, have invented certain new and useful Improvements in Faucets for Cheese Apparatus, of which the following is a specification.

This invention relates to apparatus for manufacturing cheese and has reference more particularly to a faucet designed to be used as a connection between a vat and a canal box, being divided out of my application filed August 4, 1908, Serial Number 446,906.

An object of this invention is to provide a suitable faucet or valve for feeding the products from a vat to a canal box of a cheese making apparatus, in order that a uniform flow of the material from the vat irrespective of the contents of the vat will result.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, illustrates a view in perspective of a faucet embodying the invention; Fig. 2, illustrates a longitudinal vertical sectional view thereof with the faucet opened; and Fig. 3, illustrates a similar view showing the faucet closed.

The faucet comprises in its construction a casing 9, rectangular in contour having an extension 10, which is designed to enter the side of a vat or receptacle. The extension 10, is provided with an aperture 11, leading into the chamber 11ª, of the casing to permit the liquid to flow from the receptacle through the aperture 10, and chamber 11ª, and discharge from the end of the casing opposite the end containing the rounded portion 10. The valve has a body 12, with a recess 14, therein and a bottom 17. The valve also has a movable end 15, which is the valve proper, said valve being movable in the recess 14, through the medium of a spring mechanism which consists of a pin 24 extending from the valve which is encircled by a spring 23 (said spring being held against displacement by the pin 24), a rod 20 projecting into the spring at its end opposite the pin and the nut 22 threaded on the rod 20 to adjust the spring. The rod is pivoted on the connection 16 which also forms a pivot for the body 12. By reason of the spring mechanism, the valve is held seated regardless of the wear on said seat.

The handles 18, are preferably resilient and bearing against the outer surface of the casing to such an extent as to retain the valve in adjusted position although the valve will also be retained in adjusted position by reason of the pressure of the spring 23, which forces the valve 15, into contact with the valve seat 25, formed in the end of the casing 9.

I claim

1. In a faucet, a casing having a rectangular recess therein and a valve seat at the end of said recess, a body in the recess of the casing pivoted near the end of the casing remote from the valve seat, said body having its end at the valve seat open, a valve movable therein, and means for holding the valve on the valve seat.

2. In a faucet, a casing having a rectangular recess therein and a valve seat at one end of the recess, a body in the recess of the casing pivoted near the end of the casing remote from the valve seat, the body having a recess opening through the end of the body remote from the pivot and a valve therein adapted to engage the valve seat.

3. A faucet having a casing with a recess, a body swingingly mounted in the recess, handles secured to the body and adapted to frictionally engage the outer walls of the casing, a valve in the body, means for yieldingly holding the valve in engagement with its seat.

4. A faucet comprising a casing having a hollowed out portion, a valve seat in said casing, a pin passing through the walls of said casing, a body in said casing pivoted on said pin, a rod pivoted to said pin and extending longitudinally of said body, a spring on said rod, and a valve carried by said body, said spring adapted to force said valve into contact with the valve seat.

In testimony whereof, I affix my signature in the presence of two witnesses.

JOHN BRENSIKE.

Witnesses:
WILLIAM HUTH,
WILLIAM E. REIM.